United States Patent
Lee

(10) Patent No.: US 9,494,767 B2
(45) Date of Patent: Nov. 15, 2016

(54) OPTICAL SYSTEM

(71) Applicant: LG INNOTEK CO., LTD., Seoul (KR)

(72) Inventor: Sang Hun Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 14/419,991

(22) PCT Filed: Apr. 26, 2013

(86) PCT No.: PCT/KR2013/003597
§ 371 (c)(1),
(2) Date: Feb. 6, 2015

(87) PCT Pub. No.: WO2014/025121
PCT Pub. Date: Feb. 13, 2014

(65) Prior Publication Data
US 2015/0168691 A1    Jun. 18, 2015

(30) Foreign Application Priority Data
Aug. 8, 2012 (KR) .................. 10-2012-0086890

(51) Int. Cl.
| G02B 5/18 | (2006.01) |
| G02B 13/00 | (2006.01) |
| G02B 9/34 | (2006.01) |
| G02B 27/42 | (2006.01) |
| G02B 13/18 | (2006.01) |

(52) U.S. Cl.
CPC ............ G02B 13/0055 (2013.01); G02B 9/34 (2013.01); G02B 13/004 (2013.01); G02B 27/4205 (2013.01); G02B 13/18 (2013.01)

(58) Field of Classification Search
CPC ............ G02B 13/0055; G02B 13/004; G02B 13/0075; G02B 13/16; G02B 13/18; G02B 9/34; G02B 27/4205; G02B 27/4211

USPC ................ 359/558, 753, 688, 450, 684, 715
See application file for complete search history.

(56) References Cited

U.S. PATENT DOCUMENTS

| 2010/0309367 A1 | 12/2010 | Iba et al. |
| 2012/0162769 A1* | 6/2012 | Suzuki ............... G02B 27/0037 359/558 |
| 2012/0229695 A1 | 9/2012 | Iba et al. |

FOREIGN PATENT DOCUMENTS

| JP | H11-084229 A | 3/1999 |
| JP | 2007-127953 A | 5/2007 |
| JP | 2010-060834 A | 3/2010 |
| JP | 2011-018031 A | 1/2011 |
| JP | 2011-107631 A | 6/2011 |

OTHER PUBLICATIONS

International Search Report in International Application No. PCT/KR2013/003597, filed Apr. 26, 2013.

* cited by examiner

Primary Examiner — Euncha Cherry
(74) Attorney, Agent, or Firm — Saliwanchik, Lloyd & Eisenschenk

(57) ABSTRACT

Disclosed is an optical system. The optical system includes first to fourth lenses sequentially arranged from an object side to an image surface, and satisfies Equation 1, $1.5 < n2 < 1.55,$ $20 < v1 < 30,$ and $20 < v3 < 30,$     Equation 1 in which n2 represents a refractive index of the second lens, v1 represents an abbe number of the first lens, and v3 represents an abbe number of the third lens.

19 Claims, 1 Drawing Sheet

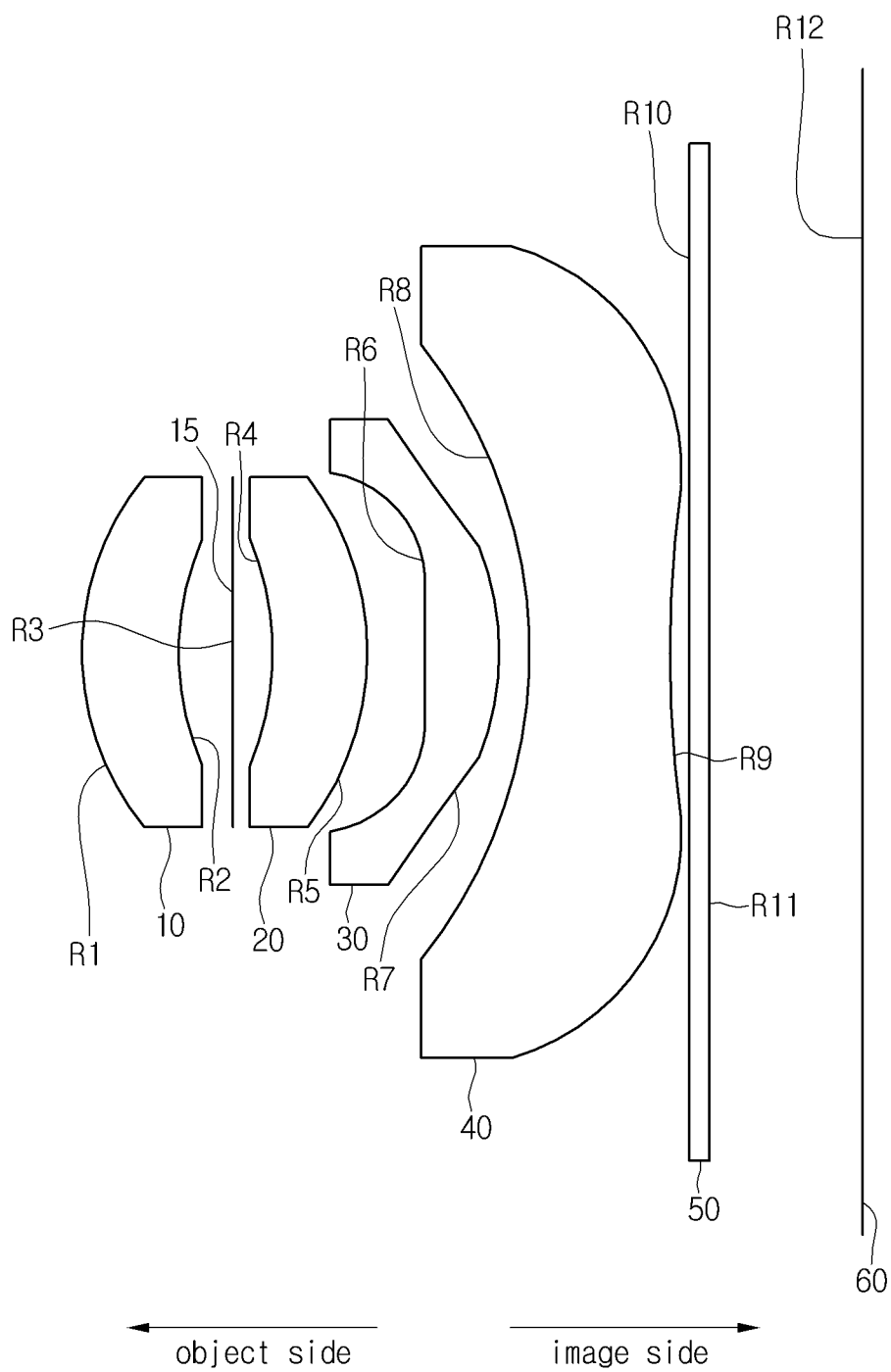

OPTICAL SYSTEM

CROSS-REFERENCE TO RELATED APPLICATIONS

This application is the U.S. national stage application of International Patent Application No. PCT/KR2013/003597, filed Apr. 26, 2013, which claims priority to Korean Application No. 10-2012-0086890, filed Aug. 8, 2012, the disclosures of each of which are incorporated herein by reference in their entirety.

TECHNICAL FIELD

The embodiment relates to an optical system.

BACKGROUND ART ecently, a cellular phone or a mobile communication terminal is equipped with a compact digital camera or a compact digital video camera employing a solid state image sensor, such as a CCD (charge coupled device) or a CMOS (complementary metal oxide semiconductor) image sensor. Such an image sensor has become scaled-down, so that an optical system used for the image sensor is needed to have a small size and high performance.

In addition, an optical system according to the related art includes first to fourth lenses, a filter, and a light receiving device. In this case, the first to fourth lenses are sequentially arranged to an image side from an object side. In addition, the first and third lenses may have positive refractive power, and the second and fourth lenses may have negative refractive power. In addition, the second lens may be designed to have the refractive power greater than that of the other lenses.

The first lens may have a surface convex toward the object side, and the second lens may have a surface concave toward the image side. The filter may include an infrared filter, and the light receiving device may include a CCD image sensor or a CMOS image sensor.

The above small optical system is disclosed in Korean Patent Application No. 10-2007-0041825.

DISCLOSURE OF INVENTION

Technical Problem

The embodiment provides an optical system having improved performance and a small size.

Solution to Problem

In order to accomplish the above object, there is provided an optical system including first to fourth lenses sequentially arranged from an object side to an image side, and satisfies following Equation 1, $$1.5 < n2 < 1.55,$$

$$20 < v1 < 30, \text{ and}$$

$$20 < v3 < 30, \quad \text{Equation 1}$$

in which n2 represents a refractive index of the second lens, v1 represents an abbe number of the first lens, and v3 represents an abbe number of the third lens.

According to the embodiment, the optical system may satisfy following Equation 3, $$0.8 < f1/F < 1.2 \quad \text{Equation 3}$$

in which f1 represents an effective focal distance of the first lens.

According to the embodiment, the optical system may satisfy following Equation 4, $$\phi 2 < \phi 1 < \phi 3 < \phi 4 \quad \text{Equation 4}$$

in which $\phi 1$, $\phi 2$, $\phi 3$, and $\phi 4$ represent refractive power of the first lens, refractive power of the second lens, refractive power of the third lens and refractive power of the fourth lens, respectively.

According to the embodiment, the optical system may further include an aperture between the first and second lenses.

According to the embodiment, the first to third lenses may have positive refractive power, and the fourth lens may have negative refractive power.

According to the embodiment, surfaces of the first to fourth lenses facing the object side and surfaces of the first to fourth lenses facing the image side may be aspheric surfaces.

According to the embodiment, at least one surface of the surface of the first lens facing the object side and the image surface may include a diffractive pattern.

According to the embodiment, a filter may be provided next to the fifth lens in a direction of the image side from the object side.

According to the embodiment, the first to fourth lenses may include plastic.

Advantageous Effects of Invention

As described above, when the optical system of the embodiment is designed as described above, the optical system can satisfy following Equation 2.

$$1 < TTL/F < 1.3 \quad \text{Equation 2}$$

In Equation 2, TTL represents a distance from the side of the first lens facing the object side to the image surface, and F represents the whole effective focus length.

As described above, the distance from the side of the first lens facing the object side to image surface, that is, the whole length of the optical system according to the embodiment may represent a very small value.

Accordingly, the optical system according to the embodiment can have improved performance and a small size.

BRIEF DESCRIPTION OF DRAWINGS

FIG. 1 is a side sectional view schematically showing the internal structure of a small optical system according to the embodiment.

MODE FOR THE INVENTION

Hereinafter, an imaging lens according to the embodiment will be described in detail with reference to accompanying drawings.

FIG. 1 is a side sectional view schematically showing the internal structure of a small optical system according to the embodiment.

Referring to FIG. 1, the small optical system according to the embodiment includes a first lens 10, an aperture 15, a second lens 20, a third lens 30, a fourth lens 40, a filter 50, and a light receiving device 60 which are sequentially arranged from an object side to an image side.

In order to obtain the image of an object, light corresponding to image information is incident onto the light receiving deice 70 after passing through the first lens 10, the aperture 15, the second lens 20, the third lens 30, the fourth lens 40, and the filter 50.

The first to third lenses 10 to 30 may have a positive refractive power. The fourth lens 40 may have a negative refractive power.

In addition, a diffractive pattern may be formed at one surface of at least one of the first to third lenses 10 to 30. Accordingly, the performance of the whole optical system can be improved according to the diffractive pattern.

In this case, the first to fourth lenses 10 to 40 may satisfy following Equation 4.

$$\phi2<\phi1<\phi3<\phi4 \qquad \text{Equation 4}$$

In Equation 4, $\phi1$, $\phi2$, $\phi3$, and $\phi4$ represent refractive powers of the first to fourth lenses 10 to 40, respectively.

In addition, the first to fourth lenses 10 to 40 may include glass or plastic. Preferably, the first to fourth lenses 10 to 40 may include plastic.

A surface R1 of the first lens 10 facing an object side may have a convex shape, and a surface R2 of the first lens 10 facing an image side may have a concave shape. The surface R1 of the first lens 10 facing the object side and the surface R2 of the first lens 10 facing the image side may have an aspheric surface. In addition, the first lens 10 may have the shape of a meniscus.

The focus length of the first lens 10 may satisfy following Equation 3.

$$0.8<f1/F<1.2 \qquad \text{Equation 3}$$

In Equation 3, f1 represents an effective focal distance of the first lens 10 and F represents a whole focus distance of a small optical system according to the embodiment.

In addition, an abbe number v1 of the first lens 10 may be greater than about 20. In more detail, the abbe number v1 of the first lens 10 may be in the range of about 20 to about 30.

The second lens 20 may have the shape of a meniscus. A surface R4 of the second lens 20 facing the object side may have a concave shape, and a surface R5 of the second lens 20 facing the image side may have a convex shape. The surface R4 of the second lens 20 facing the object side and the surface R5 of the second lens 20 facing the image side may have an aspheric surface.

A refractive index n2 of the second lens 20 may be in the range of about 1.5 to about 1.55. In more detail, the refractive index n2 of the second lens 20 may be in the range of about 1.5 to about 1.55 on a d line.

The third lens 30 may have the shape of a meniscus. A surface R6 of the third lens 30 facing the object side may have a concave shape, and a side R7 of the third lens 30 facing the image side may have a convex shape. The surface R6 of the third lens 30 facing the object side and the side R7 of the third lens 30 facing the image side may have an aspheric surface.

In addition, an abbe number v3 of the third lens 30 may be greater than about 20. In more detail, the abbe number v3 of the third lens 30 may be in the range of about 20 to about 30.

The fourth lens 40 may have the shape of a meniscus. A side R8 of the fourth lens 40 facing the object side may have a concave shape, and a side R9 of the fourth lens 40 facing the image side may have a convex shape. The side R8 of the fourth lens 40 facing the object side and the side R9 of the fourth lens 40 facing the image side may have an aspheric surface.

The aperture 15 is interposed between the object side and the first lens 10 or between the first lens 10 and the second lens 20 to converge selectively incident light so that a focus length can be adjusted.

When the aperture 15 is interposed between the first and second lenses 10 and 20, the aperture 15 may face the first and second lenses 10 and 20, and a diffractive pattern may be formed at one surface of one of the first and second lenses 10 and 20, which is closer to the aperture 15. In addition, when the aperture 15 is interposed between the object side and the first lens 10, the diffractive pattern may be formed at one surface of the first lens 10 facing the aperture 15. Accordingly, the performance of the whole optical system can be improved due to the diffractive pattern.

The filter 50 may include an infrared cut filter (IR cut filter) 50. The IR cut filter 50 prevents radiant heat, which is emitted from external light, from being transferred to the light receiving device 60. In other words, the infrared cut filter 50 transmits visible light, and reflects infrared light so that the infrared light is discharged to the outside.

In addition, the light receiving device 60, on which an image is formed, may include an image sensor to convert an optical signal, which corresponds to the image of an object, into an electrical signal, and the image sensor may include a CCD sensor or a CMOS sensor.

The small optical system according to the embodiment satisfies the following Equation 1.

$$1.5<n2<1.55,$$

$$20<v1<30,$$

and $$20<v3<30. \qquad \text{Equation 1}$$

In Equation 1, n2 represents a refractive index of the second lens 20, v1 represents the abbe number of the first lens 10, and v3 represents the abbe number of the third lens 30.

In addition to Equation 1, the small optical system according to the embodiment may satisfy following equation 3.

$$0.8<f1/F<1.2 \qquad \text{Equation 3}$$

In Equation 3, f1 represents an effective focus length of the first lens 10, and F represents the whole effective focus length of the small optical system according to the embodiment.

In addition to Equations 1 and 3, the small optical system according to the embodiment may satisfy following Equation 4.

$$\phi2<\phi1<\phi3<\phi4 \qquad \text{Equation 4}$$

In Equation 4, $\phi1$ represents refractive power of the first lens 10, $\phi2$ represents refractive power of the second lens 20, $\phi3$ represents refractive power of the third lens 20, and $\phi4$ represents refractive power of the fourth lens 40.

Therefore, the small optical system according to the embodiment may satisfy following Equation 2.

$$1<TTL/F<1.3 \qquad \text{Equation 2}$$

In Equation 2, TTL represents a distance from the surface R1 of the first lens 10 facing the object side to an image surface R12, and F represents the whole effective focus length.

The small optical system according to the embodiment represents lower TTL based on the whole effective focus length. In other words, the distance from the surface R1 of the first lens 10 facing the object side to the image surface 12, that is, the whole length of the optical system according to the embodiment may represent a very small value.

Therefore, the optical system according to the embodiment can represent improved performance in a very small size.

EXPERIMENTAL EXAMPLE

The small optical system according to the experimental example represents an optical characteristic shown in table 1

TABLE 1

| Lens surface | Radius of curvature (mm) | Thickness (mm) | Refractive index | Abbe's number | Note |
|---|---|---|---|---|---|
| R1* | 1.4483 | 0.5579 | 1.614 | 25.6 | first lens |
| R2* | 2.9091 | 0.1000 | | | |
| R3 | ∞ | 0.2862 | | | aperture |
| R4* | −27.9534 | 0.4349 | 1.531 | 55.7 | second lens |
| R5* | −10.3253 | 0.4313 | | | |
| R6* | −2.6915 | 0.3897 | 1.635 | 23.9 | third lens |
| R7* | −1.2116 | 0.1000 | | | |
| R8* | −3.6379 | 0.8000 | 1.614 | 25.6 | fourth lens |
| R9* | 2.5221 | 0.1000 | | | |
| R10 | ∞ | 0.1000 | 1.516 | 64.0 | filter |
| R11 | ∞ | 0.8000 | | | filter |
| R12 | ∞ | 0 | | | sensor |

(mark * represents aspheric surface)

The thickness marked in Table 1 represents a distance from each lens surface to a next lens surface.

Following table 2 shows aspheric surface coefficient of an aspheric lens according to the embodiment.

TABLE 2

| Lens surface | K | $A_1$ | $A_2$ | $A_3$ | $A_4$ | $A_5$ | $A_6$ | $A_7$ |
|---|---|---|---|---|---|---|---|---|
| R1 | −0.138238 | 0.303517E−02 | 0.269654E−01 | −.314009E−01 | −.178142E−01 | 0.888292E−01 | −.542516E−01 | −.144955E−01 |
| R2 | −6.566021 | 0.216877E−01 | 0.507122E−02 | 0.596661E−02 | −.844347E−01 | 0.108780E+00 | −.297654E+00 | −.454264E−01 |
| R3 | 0.000000 | −.100815E+00 | −.113338E+00 | 0.549293E−01 | −.659021E+00 | 0.962385E+00 | −.233657E+00 | −.802568E+00 |
| R4 | 0.000000 | −.604158E−01 | −.147449E+00 | 0.367529E−01 | −.210521E+00 | 0.499976E−01 | −.340594E−01 | 0.301534E−01 |
| R5 | 2.021276 | −.106051E−01 | −.220030E+00 | 0.227200E+00 | −.953139E+00 | 0.133765E+01 | −.468247E+00 | −.687167E+00 |
| R6 | −0.452128 | −.394564E−01 | 0.305900E−01 | 0.579595E−02 | 0.188514E−01 | 0.454216E−02 | −.105829E−01 | 0.366590E−02 |
| R7 | −45.560111 | −.451793E+00 | 0.345541E+00 | −.440009E−01 | −.250662E−01 | −.606438E−02 | 0.762060E−02 | −.125547E−02 |
| R8 | −20.406502 | −.132970E+00 | 0.627776E−01 | −.236669E−01 | 0.594938E−02 | −.125003E−02 | 0.228990E−03 | −.220231E−04 |

An aspheric constant of Table 2 for the aspheric lens according to the experimental example can be obtained from Equation 6.

$$Z = \frac{CY^2}{1 + \{1 - (1+K)(C^2 Y^2)\}} + (A_1)Y^4 + (A_2)Y^6 + (A_3)Y^8 + (A_4)Y^{10} + (A_5)Y^{12} \quad \text{Equation 6}$$

Z: a distance from a vertex of a lens in an optical axis direction
C: a basic curvature of a lens
Y: a distance in a direction perpendicular to an optical axis
K: a conic constant
A1, A2, A3, A4, A5: aspheric constants The aspheric shape for each lens according to the experimental example is determined as described above.

In addition, according to the experimental example, each lens is designed as shown in table 3.

TABLE 3

| | Effective focal length(mm) | Refractive index | Abbe's number | Refractive power(1/mm) |
|---|---|---|---|---|
| first lens | 3.578 | 1.614 | 25.6 | 0.279 |
| second lens | 30.465 | 1.531 | 55.7 | 0.032 |
| third lens | 3.120 | 1.635 | 23.9 | 0.320 |
| fourth lens | −2.294 | 1.614 | 25.6 | −0.436 |

When the small optical system according to the experimental example is designed as described above, the small optical system can represent performance shown in following table 4.

TABLE 4

| F | 4.1 |
|---|---|
| TTL | 4.6 |
| f1/F | 0.87 |
| TTL/F | 1.12 |

As described above, if the small optical system according to the experimental example satisfies Equation 1 and Equations 3 to 4, the values of TTL and F can be obtained in such a manner that the small optical system satisfies Equation 2.

Accordingly, the small optical system according to the embodiment is designed as shown in Equation 1 and Equations 3 to 4, so that the small optical system can have improved performance and a small size.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An optical system comprising:
first to fourth lenses sequentially arranged from an object side to an image side; and
an aperture configured to converge selectively incident light so that a focus length can be adjusted,
wherein a diffractive pattern is formed at one surface of at least one of the first to third lenses facing the aperture; and
wherein the optical system satisfies the following Equation 1, $1.5 < n2 < 1.55$, $20 < v1 < 30$, and $20 < v3 < 30$;  Equation 1 in which n2 represents a refractive index of the second lens, v1 represents an Abbe number of the first lens, and v3 represents an Abbe number of the third lens.

2. The optical system of claim 1, wherein the optical system satisfies following Equation 2, $1 < ttl/F < 1.3$  Equation 2 in which ttl represents a distance from a surface of the first lens facing the object side to an image surface, and F represents a whole effective focus length.

3. The optical system of claim 2, wherein the optical system satisfies following Equation 3, $0.8 \leq f1/F < 1.2$  Equation 3 in which f1 represents an effective focal distance of the first lens.

4. The optical system of claim 3, wherein the optical system satisfies following Equation 4, $\phi 2 < \phi 1 < \phi 3 < \phi 4$  Equation 4 in which $\phi 1$, $\phi 2$, $\phi 3$, and $\phi 4$ represent refractive power of the first lens, refractive power of the second lens, refractive power of the third lens and refractive power of the fourth lens, respectively.

5. The optical system of claim 4, wherein the aperture is interposed between the first and second lenses.

6. The optical system of claim 5, wherein the diffractive pattern faces the aperture, and is formed at one surface of a lens closer to the aperture.

7. The optical system of claim 4, wherein the first to third lenses have positive refractive power, and the fourth lens has negative refractive power.

8. The optical system of claim 4, wherein surfaces of the first to fourth lenses facing the object side and surfaces of the first to fourth lenses facing the image side are aspheric surfaces.

9. The optical system of claim 4, further comprising a filter provided next to the fifth lens in a direction of the image side from the object side.

10. The optical system of claim 1, wherein the first to fourth lenses include plastic.

11. The optical system of claim 4, wherein the aperture is interposed between the object side and the first lens.

12. The optical system of claim 11, wherein the diffractive pattern is formed at one surface of the first lens facing the aperture.

13. The optical system of claim 1, wherein a surface of the first lens facing the object side has a convex shape and a surface of the first lens facing the image side has a concave shape.

14. The optical system of claim 13, wherein the surface of the first lens facing the object side and the surface of the first lens facing the image side has an aspheric surface.

15. The optical system of claim 1, wherein a surface of the second lens facing the object side has a concave shape, and a surface of the second lens facing the image side has a convex shape.

16. The optical system of claim 1, wherein a surface of the third lens facing the object side has a concave shape, and a side of the third lens facing the image side has a convex shape.

17. The optical system of claim 16, wherein the surface of the third lens facing the object side and the side of the third lens facing the image side has an aspheric surface.

18. The optical system of claim 1, wherein a side of the fourth lens facing the object side has a concave shape, and a side of the fourth lens facing the image side has a convex shape.

19. The optical system of claim 18, wherein the side of the fourth lens facing the object side and the side of the fourth lens facing the image side has an aspheric surface.

* * * * *